Feb. 29, 1944.  A. E. MASEK  2,342,880
CLUTCH
Filed July 3, 1942   2 Sheets-Sheet 1
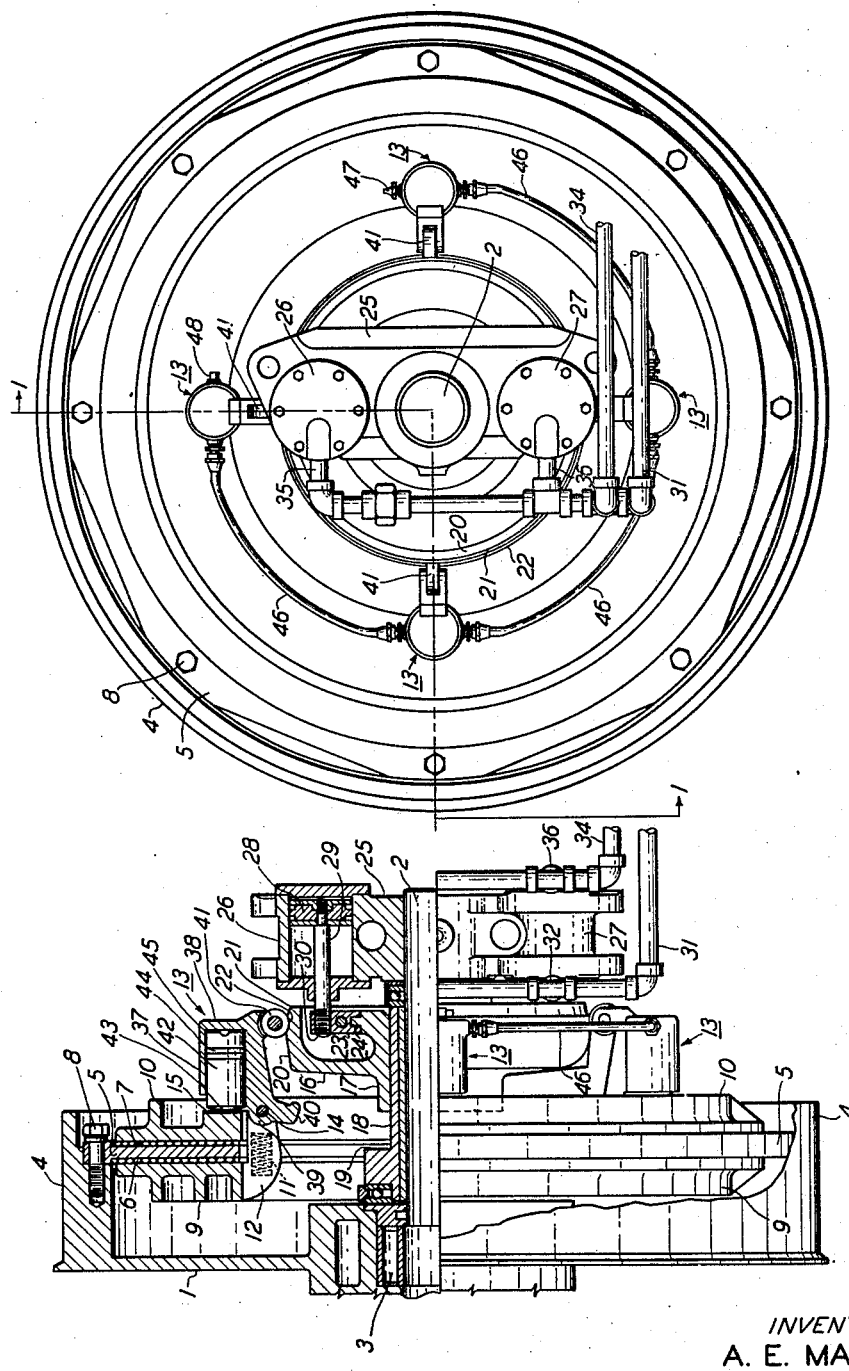
INVENTOR
A. E. MASEK
BY
ATTORNEY Feb. 29, 1944.  A. E. MASEK  2,342,880
CLUTCH
Filed July 3, 1942  2 Sheets-Sheet 2

INVENTOR
A. E. MASEK
BY
ATTORNEY

Patented Feb. 29, 1944

2,342,880

UNITED STATES PATENT OFFICE 2,342,880

CLUTCH

Adolph E. Masek, Tulsa, Okla., assignor to Franks Manufacturing Corporation, Tulsa, Okla., a corporation of Oklahoma Application July 3, 1942, Serial No. 449,625

3 Claims. (Cl. 192—85)

This invention relates to clutch mechanisms of the friction plate type and particularly to improvements in the clutch engaging mechanism whereby equalized pressures may be applied to all portions of the engaged surfaces of the clutch.

A principal object of this invention is to provide means for hydraulically equalizing the pressures on the clutch engaging surfaces to assure firm and smooth engagement of the clutch members, and to eliminate undue and uneven wear of the engaging members.

A more specific object is to provide an improved form and arrangement for applying hydraulically equalized pressure about the surfaces of the clutch members through the medium of a plurality of hydraulically connected clutch dogs employed for effecting engagement of the clutch members.

Other objects and advantages of this invention will be apparent from the following description when read in conjunction with the accompanying drawings which illustrate one embodiment in accordance with this invention.

In the drawings:

Fig. 1 is a side view, partly in longitudinal section along line 1—1 of Fig. 2, of a clutch mechanism in accordance with this invention showing the parts when the clutch members are in engagement;

Fig. 2 is a front end elevation of the clutch mechanism shown in Fig. 1;

Figure 4:
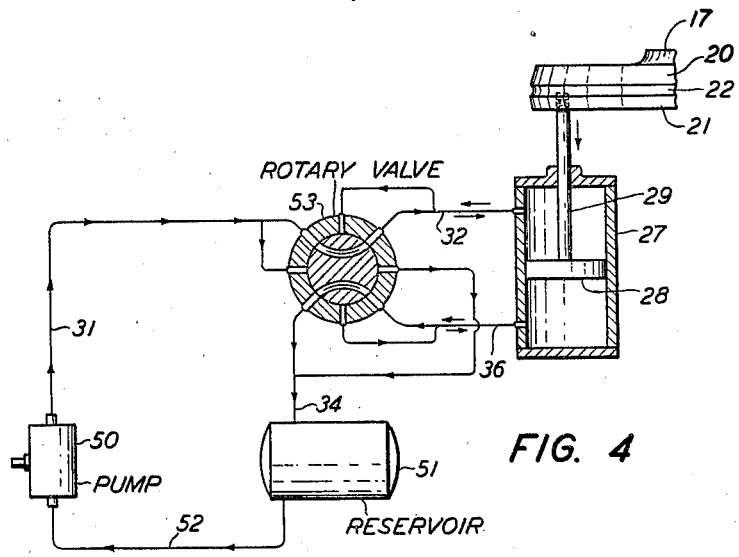
Fig. 4 is a schematic flow diagram showing the circulatory system for the hydraulic fluid employed in connection with the clutch mechanism.

Referring to the drawings, a clutch drum 1 is mounted on a stationary shaft 2 and is rotatable thereon through the medium of roller bearings 3. Drum 1 is adapted to be connected to a machine element (not shown) to be driven thereby. Drum 1 is provided with an annular horizontally extending edge flange 4. Extending parallel to drum 1 is an annular friction plate 5 faced on both sides with friction surfaces 6 and 7. Friction plate 5 is rigidly connected to anular flange 4 by means of bolts 8. Disposed on opposite sides of friction plate 5 are ring shaped inside and outside driving plates 9 and 10, respectively, which are adapted to move toward each other to engage friction surfaces 6 and 7 and to move in the opposite direction for disengaging the clutch members. Driving plates 9 and 10 are, of course, rotatable relative to shaft 2 and are normally held apart and away from friction surfaces 6 and 7 by means of a plurality of coil springs 11 which are arranged concentrically about the axis of the clutch. The inside driving plate 9 is provided with a plurality of arms 12 equally spaced about its inner periphery and extending forwardly through the group of clutch plates to a point adjacent the front face of outside driving plate 10. A clutch dog, designated generally by the numeral 13, is pivotally connected to the end of each of arms 12 by means of a pivot pin 14 and these clutch dogs are adapted to bear on suitable bearing surfaces 15 circularly disposed on the outer face of outside driving plate 10. With this arrangement, when clutch dogs 13 are brought to bear on bearing surfaces 15 to force driving plate 10 into engagement with friction plate 7, this movement will simultaneously draw inside driving plate 9 into engagement with the opposite friction plate 6 through leverage exerted through arms 12 about pivot pins 14 as the fulcrums. Mounted on shaft 2 inside the circular area enclosed by the clutch dogs 13 is a circular shifting plate 16, provided with a hub 17 extending on opposite sides of shifting plate 16. Plate 16 is rotatable on shaft 2 about a bearing 18 on which it is also longitudinally slidable inwardly for a distance limited by a stop 19. Shifting plate 16 is provided with a peripheral flange 20 extending rearwardly therefrom. The rear portion of the upper face of flange 20 tapers downwardly and rearwardly to form a circumferential cam surface 21 which terminates at an intermediate portion of flange 20 in a circumferential locking groove 22. A ring shaped shifting yoke 23 surrounds the outer end of hub 17 and is rotatively engaged therewith through an annular tongue-and-groove connection 24. Mounted on the outer end of shaft 2 rearwardly of shifting plate 16 is a pillow block 25 carrying horizontally disposed upper and lower hydraulic cylinders 26 and 27, respectively, in each of which is disposed a piston 28 provided with a piston rod 29 which extends from the forward end of its cylinder and is firmly connected to shifting yoke 23, as by means of threads 30. A supply pipe 31 is adapted for the transmission of hydraulic fluid to and from the front ends of cylinders 26 and 27 through a pair of branch pipes 32 (only one of which is shown) and a second supply pipe 34, is similarly adapted for the transmission of hydraulic fluid to and from the rear ends of cylinders 26 and 27 through branch pipes 35 and 36.

Figure 3:
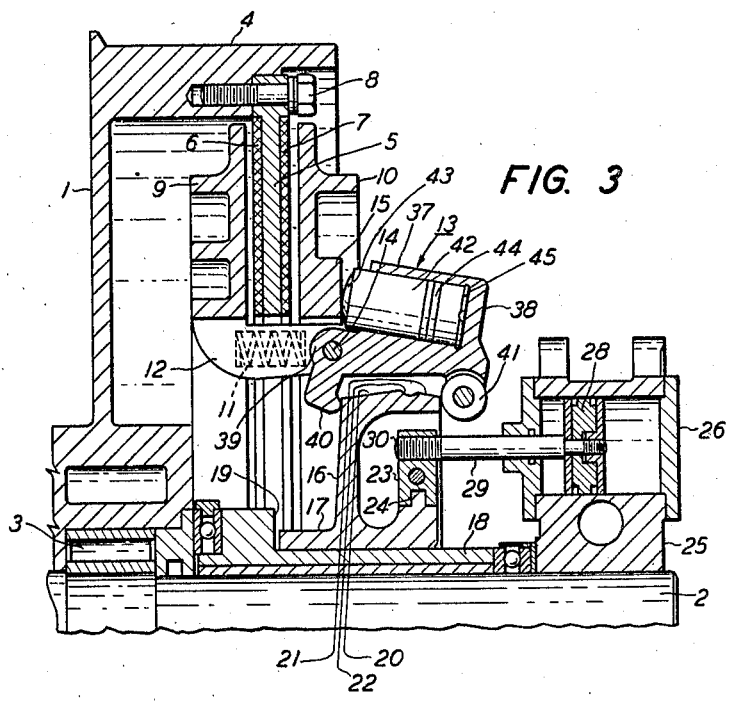
Fig. 3 is a sectional view of a portion of Fig. 1 showing the position of the parts when the clutch members are disengaged.

Each of clutch dogs 13 consists of a hollow cylinder 37 open at its inner end and closed at its outer end by a head 38. The inner end of cylinder 37 is provided with an inward extension 39 which is pivotally connected by pivot pin 14 to arm 12, as previously described. Extension 39 has a depending pawl 40 adapted to engage the inner face of shifting plate 16 when the latter is moved inwardly into clutch-releasing position (Fig. 3). The outer end of cylinder 37 adjacent peripheral flange 20 is provided with a roller 41 which is adapted to roll on cam surface 21 during the operation of the clutch, in a manner and for a purpose to be hereinafter described. A cylindrical piston 42 is disposed in each of the cylinders 37 and is provided with a rounded outer end 43 which is adapted to rockably engage its corresponding bearing surface 15. Each of the pistons 42 is provided with piston rings 44 to provide a fluid tight seal between the inner portion 45 and the open end of cylinder 37. The inner portions 45 of the several cylinders 37 are in communication with each other through a plurality of flexible tubes 46 connecting all of the cylinders in series. The cylinder at one end of the series is provided with a pressure grease fitting 47 for the introduction of a suitable hydraulic fluid, such as grease, into portions 45 of the several cylinders 37 by means of the interconnecting tubes 46. The cylinder 37 at the opposite end of the series is provided with a valve 48 which may be opened or adjusted to vary the hydraulic pressure in the several cylinders 37.

Fig. 4 is a flow diagram illustrating the system for transmitting hydraulic fluid to and from cylinders 26 and 27 for moving the clutch shifting plate 16 for effecting engagement and dis-engagement of the clutch members. As illustrated herein, the circulatory system includes a pump 50 which takes suction from a reservoir 51 through a pipe 52 and discharges hydraulic fluid through pipe 31, thence through suitably connected ports of an 8-port rotary valve 53 of conventional construction, into branch pipe 32 which leads into the front end of cylinder 27, where the entering fluid forces piston 28 in the direction shown by the arrow applied to piston rod 29. Simultaneously, fluid behind piston 28 will be forced out through branch pipe 36, thence through another pair of ports of valve 53 into pipe 34 and back to reservoir 51. When it is desired to move piston 28 in the opposite direction, valve 53 is rotated so as to place branch pipe 36 in communication with pipe 31 and to place branch pipe 32 in communication with pipe 34. Thus fluid from pump 50 will be caused to enter the rear portion of cylinder 27 through branch pipe 36 and will be expelled from the cylinder through branch pipe 32. The various ports of valve 53 and the various intercommunicating branch pipes shown on the flow sheet are employed to effectuate these reversals. It will be understood that the fluid circulating system including valve 53, as illustrated, is intended merely to portray a conventional set of connections for applying hydraulic pressure to opposite sides of piston 28 for effecting reversible movement thereof. The details of this portion of the clutch operating system form no part of the present invention. It will be understood that cylinder 26 is operated simultaneously in exactly the same manner through branch pipes 32 and 35 forming a parallel set of connections for cylinder 26 relative to pipes 31 and 34.

The mechanism heretofore described is operated in the following manner: Assume the clutch members are in the engaged position shown in Fig. 1. All of the clutch members will be engaged in rotary movement about shaft 2. Hub 17 of clutch shifting plate 16 will be rotating relative to yoke 23 through the medium of the tongue-and-groove connection 24. It is now desired to dis-engage the clutch members. Hydraulic fluid from the circulatory system illustrated in Fig. 4 is fed through branch pipes 35 and 36 to the rear ends of cylinders 26 and 27, respectively. The resulting inward movement of pistons 28 moves shifting plate 16 inwardly, hub 17 moving toward stop 19. This movement forces rollers 41 out of locking slots 22 and rearwardly over cam surfaces 21 until it drops over the rear edge of flange 20 to the position shown in Fig. 3. This movement produces a rocking movement of clutch dog cylinder 37 about pivot pins 14 drawing end 43 of piston away from bearing surface 15 freeing outside driving plate 10, from friction surface 7, the rocking movement, at the same time, acting through arm 12, and pushing inside driving plate 9 away from friction surface 6. These movements result in dis-engagement of the clutch members. When rollers 41 drop down over the rear edge of flange 20, pawl 40 will contact the inner face of shifting plate 16 and will prevent accidental re-engagement of the clutch through the action of centrifugal force, since one or the other of the dis-engaged clutch members will normally continue to rotate.

When it is desired to re-engage the clutch, the movement of pistons 28 is reversed, retracting clutch shifting plate 16. This movement forces rollers 41 over cam surfaces 21 and this in turn raises the clutch dogs 13 bringing the pistons 42 back into contact with bearing surfaces 15, and thereby moving driving plates 9 and 10 toward each other into engagement with the friction surfaces of friction plate 5. By hydraulically equalizing the pressure of each of the pistons 42 on bearing surfaces 15 through the interconnection of cylinders 37 through tubes 46, equalized pressure will be applied at a plurality of equally spaced points about the clutching surfaces, and will thereby eliminate or greatly obviate the danger of unequal gripping of the clutch faces, consequent loss of power through slipping, and will also eliminate the difficulty of adjustment experienced with more conventional clutch dogs employing screw adjustments for equalizing the pressure.

It will be understood that shifting plate 16 may also be mechanically shifted for actuating the clutch members with entirely successful results.

It will be evident that the described form and arrangement of the clutch dogs may be applied to single or multiple plate clutches with equal efficiency. It will also be understood that various cahnges may be made in the details of the device herein described within the scope of the appended claims but without departing from the spirit of this invention.

What I claim and desire to secure by Letters Patent is:

1. In friction type clutches employing parallel plate members adapted to be clutched together, improved means for equalizing the clutching pressure comprising, a plurality of clutch dogs uniformly spaced about one of the plate members in rockable compressive engagement therewith and having pivoted connection to the other of said plate members, means for connecting all of said clutch dogs to a common source of hydraulic pressure, and cam means engageable with said clutch dogs for rocking them into and out of compressive engagement with said one of said plate members for effecting engagement and dis-engagement of the plate members.

2. In friction type clutches employing parallel plate members adapted to be clutched together, improved means for equalizing the clutching pressure comprising, a plurality of clutch dogs uniformly spaced about one of the plate members, each of said clutch dogs including a cylinder and a piston mounted therein, the piston having compressive rocking engagement with said one of the plate members and the cylinder having pivoted connection to the other of said plate members, means for connecting all of said cylinders to a common source of hydraulic pressure, and cam means engageable with all of said cylinders to impart rocking movement thereto whereby to move said pistons into and out of engagement with said one of said plate members for effecting engagement and dis-engagement of the plate members.

3. In a friction type clutch including a friction plate and inside and outside driving plates adapted to be moved toward and away from the friction plate for clutching engagement and dis-engagement therewith, a plurality of clutch dogs comprising cylinders pivotally linked to the inside driving plate and pistons mounted in the cylinders and having rockable compressive engagement with the outside driving plate, means for connecting all of said cylinders to a common source of hydraulic pressure for equalizing the pressure on all of said pistons, and cam means engageable with all of said cylinders to impart rocking movement thereto whereby to move said pistons into and out of compressive engagement with said outside driving plate.

ADOLPH E. MASEK.